United States Patent Office 3,338,700
Patented Aug. 29, 1967

3,338,700
FERTILIZER TABLET WHICH RAPIDLY DISINTE-
GRATES WHEN WATERED AND THEREAFTER
SLOWLY RELEASES ITS PLANT NUTRIENTS
Hollis M. Barron, Los Gatos, Calif., assignor to Agriform
International Chemicals, Inc., Newark, Calif., a corporation of California
No Drawing. Filed Dec. 9, 1966, Ser. No. 600,369
5 Claims. (Cl. 71—29)

ABSTRACT OF THE DISCLOSURE

A tablet containing substantially water-insoluble fertilizer adapted for slowly breaking down under the influence of soil bacteria is made to rapidly disintegrate when watered. The discoverey that most tablet lubricants resist disintegration by water is accompanied by the discovery that if talic is used as the lubricant, water disintegration is not interfered with. Sodium aliginate and related compounds comprise the preferred disintegrants. Container grown plants can be fed for several months by a single tablet applicant. In addition to the water-insoluble fertilizer some water-soluble fertilizer is included to give an initial impetus to the plants.

---

This application is a continuation-in-part of application Ser. No. 324,874, filed Nov. 19, 1963 now abandoned.

This invention relates to a tablet-type plant fertilizer.

Many plants are now grown and held for sale in containers; nurserymen grow millions of plants in pots, gallon cans, and five-gallon cans. Usually care is taken to grow the plants in a sterile and disease-free soil mixture. For example, the so-called "UC Mixes," which are recommended by the University of California for nursery production, contain no earth but are made up entirely of sand, or peat moss, or peat moss and sand; in alternative forms, redwood shavings, sawdust, or rice hulls are used in place of some or all of the peat moss. None of these ingredients contains an appreciable amount of food for the plant; so the nurserymen must feed the plants, or they will die. Heretofore, feeding has been done either by incorporating a chemical fertilizer into the soil mix, by watering the plants periodically with liquid fertilizers, or by periodically applying measured amounts of granular fertilizers. Usually the nutrient value of the fertilizer has been used up quickly, and there have had to be very frequent applications of fertilizer. Moreover, a large proportion of the applied fertilizer nutrients were lost by the leaching effects of watering.

When wholesale nurserymen deliver a large number of plants to a nursery, it is desirable for each plant to have its container supplied with enough fertilizer to feed the plant for several months, preferably at least until the plant is actually sold, because many retail nurserymen neglect the feeding of the plants. A still further reason why it is desirable for the container to be supplied with enough plant food to last several months is that many people who buy plants do not at once put them into the ground and do not fertilize them either; consequently, it is desirable for the wholesale and retail nurserymen to deliver the plants with their containers already supplied with an amount and type of food that will feed them for many months. Then all that the retailer or purchaser has to do is to water the plants. An object of this invention is to provide a fertilizer tablet that will help in accomplishing these desirable purposes.

Tableted fertilizers have long been used, but heretofore they have not been able to accomplish the purposes for which the present invention is used. Some tablets have contained rapidly soluble fertilizers, which are soon consumed by the plant or are leached out. In contrast, Patent No. 3,024,098 shows very slowly soluble, non-disintegrating tablets for use when transplanting trees into the ground; these tablets last a very long time, up to two years, and require no distribution or dispersal because the trees are planted in soil and the tablets are held in their location by the soil. However, these tablets are not suitable for nursery container use, because they do not make enough food available at the beginning, nor do they make it available at a fast enough rate for container-grown plants, due to the tablets remaining hard and unbroken for a long time and thereby not exposing very much surface area to bacterial activity and to solubilization by soil moisture. Without bacterial activity, some of the main ingredients are practically insoluble, and it takes a long time for the bacteria to work on such unbroken tablets.

An object of the present invention is to provide a tableted plant food or fertilizer containing, in slowly available form, the major ingredients and some of the trace elements necessary for sustenance of the plant for approximately four to six months.

Another object is to provide a tablet which is readily, almost instantaneously, broken up by water so as to expose a large surface area of the slowly available fertilizer, thereby making the fertilizer available from the beginning and to provide for conversion at a proper rate of its intgredients from an unavailable form to an available form.

Chemical fertilizers tend to create a salinity problem, in which the soil contains salts in excess and stunt or kill the plant, instead of feeding it. Some plants are more sensitive than others, and for general use, the very sensitive plants must be considered. Another object of this invention is to provide a tablet with a low salinity index, so that plant injury from soluble salts is minimized.

Most tablets that are made from largely water-insoluble components are hard and intractable. It has not been easy to provide a tablet which breaks up completely and instantaneously without using fertilizer ingredients that are quite soluble in water. I soon found that it was necessary to include, in addition to the fertilizer ingredients, a disintegration-and-dispersal-promoting ingredient. Even then, I found that tablets made from some mixtures will break up readily when fresh but will not break up after having been stored for several months, the absorption of moisture from the air apparently causing them to harden and become almost impervious to water.

For example, I have made fertilizer tablets from slowly soluble fertilizer materials, using ordinary corn starch as a disintegrant, but I found that the disintegration rate was not rapid enough for complete dispersal of the tablet during the time water from the first irrigation was present. Then, after being once wetted and then dried, the undispersed remainder of the tablet tended to form a hard cake, apparently due to cementing effects of the once-wetted starch. The cementing effects made the tablet resist disintegration at subsequent irrigations, and the release rate of plant nutrients from the chemicals was found to be too slow to sustain healthy plant growth. Some specialized types of starch produced a fairly good disintegration rate, but the tablets still did not disperse over a wide surface of the soil, because the individual particles tended to cling together in one location—an undesirable characteristic. Dispersal is important to provide and correct nutrition.

I have also tried water-soluble gums as disintegrants for tablets of slowly-soluble fertilizers; the tablets had moderately good disintegration rates, but only fair dispersal characteristics.

The present invention provides a long-lasting slowly-soluble fertilizer tableted along with a readily water-soluble disintegrant, which dissolves very readily when water is applied, so that the tablet breaks up. In fact, the tablet will break up within one minute of the application of water and usually quicker. A nurseryman simply throws one or more tablets into each container and then waters the plants. The tablet immediately breaks up, so that fertilizer immediately begins to act on the entire plant, but, being slowly available, continues to feed the plant for months. Then the treatment is repeated.

In tableting most mixtures of materials, including the fertilizer materials involved here, it is necessary to include in the formula a lubricating ingredient to continually protect from abrasive wear the metal surfaces of the tableting equipment that come in contact with the materials being tableted, to facilitate the compression of the tablets, and to enable proper extraction of the tablets from the dies in which the tablets are formed. Many chemicals commonly used as tablet lubricants were found unsatisfactory for use in the present invention, because they tended to waterproof the tablet, minimizing the rate of water entry into it and thereby preventing or delaying disintegration of the tablet. Hence, another object of the invention is to provide a fertilizer tablet containing a lubricant that not only provides satisfactory lubrication, but does so without significantly reducing the rates of water penetration and tablet disintegration.

In the formulation of mixtures for tableting, a binder additive is usually necessary to achieve binding of particles together when pressure is applied in the tablet press. Such materials as gums, glues, resins, sugars and alginates are commonly used as binders. I have found that such binders are not necessary in fertilizer tablet formulations where the proportion of ureaformaldehyde is comparatively high (above 35%). I have made tablets using formulas listed in Examples 1 and 4 below except that the sodium alginate (Kelgin F) was not inccuded. These tablets had excellent physical characteristics, in that they were well-bound together into a hard, dense tablet, but these tablets failed to disintegrate when placed in water. Such tablets would not provide satisfactory rates of plant food release in that they would tend to remain in the tablet form exposing too little surface area for plant conversion by bacterial activity and solubilization.

I then had to discover an additive which would cause these tablets to physically break apart and distintegrate into the original individual particles in order to provide adequate rates of conversion of plant food. I found that sodium alginate (Kelgin F), calcium alginate, calcium-ammonium alginates and alginic acid—materials that have often been used as binders in tablet making—worked effectively as disintegrants in my invention. The novel combination of slow-release fertilizers and a tablet disintegrant together wtih a tablet-making lubricant that does not interfere with disintegration, is what produces the novel results of this invention.

Other objects and advantages will appear from the following description of some preferred embodiments of the invention.

The invention provides a tablet having, in combination, fertilizing agents, a lubricant which enables the proper pelleting to size while not substantially restricting the entry of water into the tablet, and a disintegrant agent, so that the table is held together strongly until it is wet and then, when wet the tablet falls apart rapidly, although up to the time when the water is applied, the tablet is very stable indeed. As the lubricant, talc is the preferred material. For the disintegrant, I have found that the sodium alginates provides tablets having ideal disintegration and dispersing characteristics. Calcium alginate, calcium-ammonium alginate and alginic acid produce tablets with fair to good characteristics, but the preferred material is a sodium alginate, such as that known as Kelgin F. The tablet preferably contains from 4 to 10% of talc and about 1 to 5% of the alginate disintegrant, i.e., alginic acid or one of its water-soluble salts.

The fertilizer tablets of this invention disintegrate physically and disperse over the soil surface upon the first application of irrigation water. Dispersal enables maximum solution of the soluble plant food content durtent during the first irrigation and enables immediate washing of this nutrient portion down into the plant root zone where the plant can rapidly take in adequate nutriment. Furthermore, rapid disintegration and dispersal provides intimate contact between the soil and the insoluble and unleachable chemicals, so that soil bacterial action commences and gradually changes the insoluble and unleachable chemicals into forms that are soluble and are available for use by the plant.

The following examples illustrate what can be done.

EXAMPLE 1

A fertilizer tablet of this invention is made from the following components:

| | Percent by wt. |
|---|---|
| Urea-formaldehyde, 38% nitrogen | 37.6 |
| Calcium phosphate, 45% $P_2O_5$ | 10.0 |
| Fritted potash, 28% $K_2O$ | 20.8 |
| Potassium sulfate, 52% $K_2O$ | 6.7 |
| Ferrous ammonium sulfate | 3.7 |
| Gypsum (calcium sulfate) | 14.2 |
| Talc | 5.0 |
| Kelgin F (sodium alginate) | 2.0 |
| Total | 100.0 |

The composition is thoroughly mixed dry and then is pelleted dry into tablets, which may be from about ½ gram to about 30 grams in size. The talc acts as a tablet lubricant during manufacture, ensuring release from the tableting cavity, but the talc also has the surprising ability of not waterproofing the tablet even though it does lubricate during manufacture.

For two-inch to four-inch pots a 1-gram tablet is useful; for four-inch to eight-inch pots 6-gram tablets are useful; and for six-inch pots up to five-gallon cans 12-gram tablets are useful, and so on.

The above formula is a scientifically balanced low-toxicity plant food with long-lasting characteristics which meets the problems of nutrition encountered by the nursery stock grower, the retail nurseryman, and also by the final purchaser of plant materials when they are to be grown in containers. The wholesale grower adds a sufficient number of tablets to the stock just prior to shipment to insure continued balanced feeding for a period of about four to six months from the date of shipment, and then waters them. The tablets may be also used as a substitute for liquid feeding during wet weather periods, when liquid feeding becomes impractical. A retail nurseryman may add the tablets to container stock not treated by the wholesaler, or if he holds the stock more than four to six months, he should add them. The home gardener may also add them once every four to six months to the pots, boxes, or tubs, always watering immediately following application.

In use, the proper number of tablets is placed on the surface of the planting medium, whether it be soil, UC mix, or whatever. They are not pressed in but are simply placed on top and watered. Thus, for two-inch and three-inch pots, one or two 1-gram tablets will suffice, for four-inch pots three to five 1-gram tablets or one 6-gram tablet will be used. For a six-inch pot one or two 6-gram tablets or one 12-gram tablet will be used. For eight-inch pots and one-gallon containers, two to four 6-gram tablets or one or two 12-gram tablets are used. For three-gallon containers, three or four 12-gram tablets are used, and for five-gallon containers four or five of the 12-gram tablets are used.

When the tablets, made as stated above, are placed on top of the planting medium and are watered, they immediately melt down, within less than one minute, and begin to disperse around and through the top area of the container. The soluble portion immediately becomes available to the plants. However, most of the ingredients are water insoluble, and therefore most of the plant food value is retained until these ingredients are acted upon by bacteria and moisture that are present in the planting medium and by repeated waterings. Therefore, leaching loss of nutrients is held to a minimum while the material is still distributed. Of course, the proper number of tablets depends upon the plant species, the level of nutrition required, the type of container, and so on.

EXAMPLE 2

The fertilizer formula of Example 1 is used as a basis, and the amounts of gypsum and sodium alginate are varied so that their sub-total remains 16.2% by weight of the whole. The sodium alginate is used as furnished by the manufacturer. Then, tablets made therefrom are watered and the disintegration and dispersal rate is measured. The results are tabulated below:

TABLE I

| Percent sodium alginate | Percent gypsum | Average time for disintegration and dispersal (sec.) | Comments |
| --- | --- | --- | --- |
| 0.5 | 15.7 | 95 | Slow. Poor dispersal. |
| 1.0 | 15.2 | 48 | Moderate dispersal rate. |
| 1.5 | 14.7 | 31 | Good. |
| 2.0 | 14.2 | 25 | Excellent. |
| 3.0 | 13.2 | 25 | Do. |
| 5.0 | 11.2 | 21 | Do. |

From this tabulation it appears that satisfactory results are obtained by using at least 1% of the commercially available form of sodium alginate. Preferably, no more than 2% is used, for reasons of economy and because the improvement thereafter is not enough for the cost involved.

Laboratory comparisons between disintegration and dispersing rates of various trial formulations was carried out by placing six tablets from the same test batch on an 8-mesh wire screen, which was then suspended in a glass container containing water at ambient temperature. Slight agitation was continually obtained in the water by means of a magnetic stirring apparatus. The comparative rate of disintegration and dispersement was checked by stopwatch from the time of placing the tablets in water until all material has disintegrated to a sufficient degree to fall by gravity through the wire screen. Replicate tests were made and average time rates were obtained.

As the soil mixtures used in most containers for growing nursery plants are rather porous in nature, free water is present on the soil surface for a limited time, for 30 seconds or less. Therefore, in test procedures a good rate of disintegration and dispersement was considered as 30 seconds or less. A moderate rate was considered as 30 to 60 seconds, and over 60 seconds was considered poor. Tablets with good disintegration but with poor dispersal characteristics were considered as those which readily and rapidly melted apart as soon as placed in water, but which failed to fall through the wire screen openings due to cohesion between small wet particles, which tended to form soft clumps, too large to pass the screen openings.

Those tablets in the good disintegration and dispersal range were subsequently field-tested in nursery containers containing common soil mixes to substantiate laboratory tests.

EXAMPLE 3

The cost of sodium alginate for use as a disintegrant in fertilizer tablets even at the 1½ to 2% level is rather expensive. It was suspected that lesser amounts might produce a good disintegration and dispersal rate if a finer particle size of sodium alginate were used. To test this possibility, the commercially available sodium alginate was separated into the following particle size ranges:

(a) Through 60 mesh (Tyler) screen and on 80 mesh screen,
(b) Through 100 mesh screen and on 150 mesh screen,
(c) Through (finer than) 200 mesh.

Tablets were made, of the six-gram size, having the same formula as used in Examples 1 and 2, using the 1 and 2% sodium alginate levels from the above different particle size separations for comparisons. The tablets were wet, and the following disintegration and dispersal rates were obtained in the laboratory tests:

TABLE II

| Tablet | Average Time to Disintegrate (sec.) | Dispersal Results |
| --- | --- | --- |
| 1% Sodium Alginate 60 to 250 mesh. | 35 | Good. |
| 1% Sodium Alginate 60 to 80 mesh. | 68 | Very little dispersement. |
| 1% Sodium Alginate 100 to 150 mesh. | 22 | Excellent. |
| 1% Sodium Alginate finer than 200 mesh. | 24 | Do. |
| 2% Sodium Alginate 60 to 250 mesh. | 25 | Good. |
| 2% Sodium Alginate 60 to 80 mesh. | 60 | Poor and incomplete. |
| 2% Sodium Alginate 100 to 150 mesh. | 23 | Excellent. |
| 2% Sodium Alginate finer than 200 mesh. | 33 | Good. |

Conclusions from these results were that particle sizes coarser than 80 mesh of sodium alginate disintegrated much slower than did finer particle sizes; in fact even ½% of sodium alginate can be used in particle sizes of 100 mesh up to give satisfactory results.

EXAMPLE 4

A nitrogen type fertilizer where supplemental extra nitrogen is required or where the soil contains a sufficient amount of phosphate and potash for awhile may be as follows:

Percent by wt.
Urea-formaldehyde, 38% nitrogen _____ 83.4
Ferrous ammonium sulfate _____ 7.2
Talc _____ 7.2
Kelgin F (sodium alginate) _____ 1.9
Pigment for identifying color _____ 0.3

Total _____ 100.0

This material is used in the same manner, and it, too, breaks up within a few seconds and starts to disperse, while the ingredients themselves in the main remain insoluble until acted upon further by moisture over a long time or by moisture and bacteria.

Example 5

Identical amounts of any of calcium alginate, calcium-ammonium alginate or alginic acid may be substituted for the amounts of sodium alginate in the preceding examples, with but slightly slower action in disintegration and dispersal.

*Example 6.—Storage tests of tablets*

To test whether moisture absorbed during storage would affect the sodium alginate portion of the tablets and reduce the disintegration rates, twelve-gram tablets were made with the same formula as in Example 2, using 2% sodium alginate disintegrant. When freshly made, these tablets had a disintegration rate of 25 to 32 seconds. Sample portions of this batch of tablets were placed under various storage conditions for a period of four months, after which the disintegration rate of the various samples was tested in the laboratory. The storage conditions tested were:

(a) Storage in corrugated paperboard containers used in marketing tablets. The tablets were packed in rice hulls as a cushioning media, and the case was placed on a wooden shelf in a warehouse under conditions generally utilized for storage.

(b) Storage in same containers with rice hulls as in (a), but with the container placed directly on a concrete floor, where maximum moisture could be absorbed. The tablets for testing were taken from the bottom of the case, where the tablets would be closest to the dampness from the concrete floor.

(c) Storage immediately following manufacture in an open glass jar in a humidity cabinet having constant 80% relative humidity.

(d) Storage immediately following manufacture in a closed, air-tight glass jar.

After four months in storage under the above conditions the following disintegration rates were obtained:

TABLE III

| Storage conditions: | Range of disintegration rate |
| --- | --- |
| (a) | 54 to 59 seconds. |
| (b) | 50 to 53 seconds. |
| (c) | 10 minutes with very little dispersal. |
| (d) | 37 to 46 seconds. |

Comparing the 25 to 32 second disintegration rate of the freshly made tablets with those obtained after the above tests, the following conclusions can be made: (1) aging alone reduced the disintegration rate only slightly (compare item (d)); (2) long term storage (item (c)) under highly humid conditions can seriously impair the disintegration rate; and (3) (items (a) and (b)) tablet disintegration rates are reduced, but not seriously, by storage for moderate lengths of time under normal conditions, as where the tablets are packed in rice hulls and in corrugated paperboard containers.

*Example 7.—Salinity trials*

When fertilizer materials are placed too close to plants or seeds, they may increase the osmotic pressure of the soil solution and cause injury to the plants by means of the contained salts. Fertilizer materials vary considerably in the amount of salinity effect each imparts to the soil solution. The salinity effect of many of the common fertilizer materials has been evaluated (see L. F. Rader, Jr. et al., Soil Science, 55: 201–218, 1943), and the term "salt index" refers to this effect of a given material in relation to that effect produced by nitrate of soda, which is given a rating of 100.

In order to minimize the possibility of causing plant damage through the use of the fertilizer tablets, fertilizer ingredients are chosen that have a very low salt index or soluble salt content, giving proper consideration to their other chemical characteristics as well. Consequently, the fertilizer tablets of this invention are comparatively safe to use on most plant species when applied at recommended rates of application.

The total salinity effect on plants from these tablets was tested on several plant species by obtaining uniform representative plants from a commercial nursery in standard gallon container sizes and fertilizing several plants of each species with various quantities of twelve-gram tablets using the same formula as in Example 2, with 2% sodium alginate disintegrant. All plants utilized were grown in a common nursery soil mix consisting of about equal parts by volume of peat moss, fine sand and rice hulls. They had been grown on continual liquid fertilizer feed system in the irrigation water and had reached a marketable size when the salinity tests were established.

Two *Lantana camara* plants were fertilized with one 12-gram tablet each, two with two 12-gram tablets each, two with three 12-gram tablets each, and two with four 12-gram tablets each. The plants were irrigated immediately after the tablets were applied and every third day thereafter. No symptoms of injury became apparent during the following eight weeks of growth, and growth characteristics were similar in all plants at the end of this period. One or two 12-gram tablets per gallon size container would be recommended for this fast growing plant, and these salinity trial results indicate that rates as high as four 12-gram tablets can be applied to this size of container and plant without salinity injury.

Similar trials were performed with Sun Azaleas, Monterey pine, sweet corn and *Xylosoma sentura,* with no salinity injury symptoms appearing with applications of two times the recommended rate. In the Sun Azaleas a slight salinity injury symptom (leaf burn) appeared in plants fertilized with four 12-gram tablets per gallon container.

EXAMPLE 8

Tablets weighing 12 grams were formulated, using about 4.2 grams urea-formaldehyde plus recommended quantities of other major plant nutrients from selected chemical sources having comparatively low salt effects and long-lasting characteristics. The formulation was approximately that of Example 1. These tablets were then field tested in many nurseries on a wide range of ornamental plants. Results were generally satisfactory with no plant injuries reported that could be directly caused by use of these fertilizer tablets where they were used as directed.

In one nursey test these tablets were compared with blood meal, a common fertilizer material used for ornamental plants as a safe, comparatively long-lasting nutrient source. General results were:

*Raphiolepsis indica rosea* (Indian Hawthorne).—The tablets produced better color and growth than did the standard blood meal program.

*Ilex* (Holly).—Equal growth resulted with tablets and blood meal, but faster leaf color development came from the tablets on several varieties of holly.

*Palms* (several unknown varieties).—Slightly more growth and better color from the tablets.

*Nandina domestica* (Heavenly Bamboo).—Plants fertilized with tablets held leaves longer and showed better growth into the winter months.

*Fiscus* (Rubber Plant).—Color and growth from tablets equal to blood meal.

EXAMPLE 9

The tablets of this invention have been tested on a wide range of plant species and by several different methods in order to evaluate their ability to feed plants.

Since nitrogen is the element of primary importance in maintaining good plant condition, trials were conducted with urea-formaldehyde, the principal nitrogen source in the tablets, to evaluate its ability to supply available nitrogen to plants grown in nursery potting mixture in containers. For these nitrogen trials, sweet corn was planted in gallon size containers as an indicator or test plant, as it is fast growing and has been proven to have a comparatively high nitrogen requirement. After germination, the corn seedling plants in containers were selected for uniformity and all were fertilized with one gram treble superphosphate and two grams of potassium sulfate per container to supply equal amounts of phosphate and potash. Then, urea-formaldehyde was applied at four different rates and in four different particle size separations for comparison of nitrogen effects.

Visual observations of subsequent growth of these corn plants over the next eight weeks indicated that nitrogen rates above 1.6 grams per gallon container effectively supplied available nitrogen to the plants in adequate amounts when using urea-formaldehyde with particle sizes finer than 24 mesh. Since the majority of ornamental plants grown in gallon size nursery containers have lower nitrogen requirements per day than the sweet corn indicator plants, sufficient urea-formaldehyde is provided in tablets which supply 1.6 grams actual nitrogen or more per gallon size container, in order to be reasonably certain of supplying adequate available nitrogen levels for most plant species. Equivalent quantities of urea-formaldehyde may be utilized in tablets designed for containers other than one gallon sizes.

Tests were then conducted to further evaluate the 1.6 grams nitrogen rate from urea-formaldehyde in gallon size containers using seven common varieties of ornamental plants. Young established plants of uniform growth were chosen in order to also determine the length of time a single application of urea-formaldehyde can be expected to maintain acceptable plant appearance in various growing plants and to compare the growth characteristics obtained with similar plants fertilized by a common liquid fertilizer program applied in the irrigation waters.

The tests were conducted on seven selected plant groups: *Juniperus sabina tamariscifolia* (Juniper Tamarix), *Sequoia sempervirens* (Coast Redwood), *Xylosma senticosa*, *Ilex cornuta bufordi* (Burford Holly), *Ophiopogan japonica* (Mondo grass), Citrus "Rangpur Lime," and *Dracaena draco* (Dragon Palm). Five test conditions were imposed on three plants of each group; later this was reduced to two plants, due to plant losses in a few scattered groups. The five treatments imposed were:

*Treatment #1.*—Application to the soil surface of 6.3 grams of finely ground urea-formaldehyde to supply 2.4 grams of actual nitrogen per gallon container.

*Treatment #2.*—Same as #1, but using rate of 4.2 grams of urea-formaldehyde (1.6 grams nitrogen).

*Treatment #3.*—Same as #1, but using 2.1 grams of urea-formaldehyde (0.8 grams nitrogen).

*Treatment #4.*—No nitrogen fertilizer.

*Treatment #5.*—Constant liquid fertilizer program in irrigation water using the following formula:

|  | Lbs. |
|---|---|
| Ammonium nitrate | 5 |
| Di-ammonium phosphate | 1 |
| Potassium chloride | 3 |
| Per 1000 gallons of water | 9 |

Gallon container stock from a nursery was lined out in a greenhouse and treated with iron chelate to supply iron, and mercurial fungicide was applied in the irrigation water. A liquid fertilizer feed program was applied to all containers in order to establish uniform starting conditions. The greenhouse was fumigated for insects on two occasions two weeks apart. Four weeks later, a soil sample was taken to determine the starting fertility level. Then all five treatments and tests were initiated. Irrigations were made only as required. Twenty days after initiation of the treatments, one half teaspoon of fritted potash, plus one-half teaspoon of single superphosphate per gallon container was applied on all treatments except the liquid fertilizer treatment. Two and a half months later, in the spring, all plants were moved outside the greenhouse into full sun. A little more than three months after that the experiment was terminated, and photographs, leaf samples, and soil samples were taken.

In Juniper Tamarix, the differences were slow to show up, growth being approximately the same in all fertilizer treatments, though growth was markedly reduced in the treatment without nitrogen. The color of plants was slightly better in the liquid fertilized group at the termination of tests, and this condition correlated with the nitrogen level in plant tissue at this time. The urea-formaldehyde treatments seemed to keep pace with the constant liquid fertilized plants for at least a four-month period. The 1.6 gram nitrogen rate produced satisfactory growth and color with no evidence of plant injury, but results indicated the need for another urea-formaldehyde application four months following the first in order to maintain adequate nitrogen levels in these plants.

The Coast Redwood group showed early and continued response to nitrogen. There was also considerable initial burning or injury to foliage from fertilizer application, particularly in the high urea-formaldehyde treatment, indicating that this species is comparatively sensitive to fertilizer burn, and the injuries sustained seemed to retard development to some degree through the test period. Growth of plants under the liquid fertilizer program was erratic, but substantially greater than other treatments at the finish of the tests. Observations and tissue test indicated the release of available nitrogen from urea-formaldehyde treatments became inadequate to sustain maximum growth sometime prior to the finish of the test period. From these results, it is judged that no greater than the 1.6 grams nitrogen rate from urea-formaldehyde should be utilized in order to minimize injury hazard to this sensitive plant species. Furthermore, a second application of nitrogen would be necessary in four to five months in order to sustain maximum growth and color.

For *Xylosoma senticosa*, the liquid feeding program had a very marked retarding effect, this plant evidently being quite sensitive to fertilizer injury, and the damage became increasingly greater with repeated liquid applications and age. The applications of urea-formaldehyde were not sufficiently damaging at the highest rate to prevent fairly good recovery. Little or no retarding or injury occurred at the medium or low urea-formaldehyde rates, and these treated plants produced satisfactory growth and color for about four months when loss of color indicated a need for additional nitrogen to sustain the plants. The tissue tests at the finish of the test indicated excesses of plant nutrients, especially nitrogen, in the plants fertilized by the liquid system. These results indicate that tableted fertilizers that supply the 1.6 grams rate of urea-formaldehyde or less would be comparatively safe on this sensitive plant, but an additional nitrogen application would be required after about four months.

The *Ilex* (Holly) crop made virtually no growth during the entire period of the experiment. Quite possibly, the photo-period was wrong for best growth for this plant and hence, fertilizer results. The results indicate that little or no benefits would be expected in fertilization of this plant during the winter months.

*Ophiogogon japonica* (Mondo grass) appears to be extremely sensitive to fertilizer injury, and considerable leaf burn was incurred with the liquid fertilizer program and from the highest rate of urea-formaldehyde. The best growth and color resulted from the 1.6 grams nitrogen rate from urea-formaldehyde, and the plants continued to respond well from this rate during the entire six and one-half month test period.

*Citrus* (Rangpur Lime) was severely infested and damaged by red spider insects, which partially interfered with test comparisons. The liquid fertilizer program produced the poorest growth results, though color at the termination of tests was good. Extremely poor color was always present in the check group. Best growth results were obtained from the medium 1.6 grams nitrogen and highest urea-formaldehyde groups, although color symptoms indicated that additional nitrogen was required just prior to the end of the test period (five or six months) in order to continue healthy color and growth in both of these treatments.

Palm (*Dracaena draco*) was exceptionally excellent and even gave growth responses to increasing increments of fertilizer with no injury symptoms. Color differences were noted after three to four months, and these differences persisted for the remainder of the test period. Best growth and color was obtained from the liquid fertilizer program, likely due to the greater quantities of plant food supplied by this system. The urea-formaldehyde fertilized plants showed improved growth and color with increasing increments of nitrogen. From these results it appears that high (2.4 grams of nitrogen or perhaps, even more) initial rates of urea-formaldehyde nitrogen and fairly frequent applications (every two to three months) would likely be necessary to provide adequate available nitrogen to this plant species to obtain best growth.

These trials indicate that nitrogen from urea-formaldehyde can be safely applied to those plant species tested at the rate of 4.2 grams (1.6 grams actual nitrogen) per gallon container. Little, if any, detrimental effects occurred at this rate in any of the plant groups, while the higher rate did produce some initial injury symptoms on three of the plant groups. The liquid fertilizer program produced serious injury on four of the plant groups.

The 4.2 gram urea-formaldehyde rate appeared to do a reasonable job of supplying sufficient nitrogen to the plants for healthy growth for four to seven months with the exception of the palm (*Dracaena draco*) species, where higher rates and more frequent applications would be necessary for best growth.

From these trials, the use of 4.2 grams of urea-formaldehyde per gallon container size tablet along with adequate amounts of other plant nutrients was concluded to be likely safe and generally adequate for many ornamental plants.

EXAMPLE 10

I have found that the rate of disintegration and degree of dispersal of tablets can be increased over those tablets made using sodium alginate as the sole disintegrant like those of Example 1 by including certain proportions (5 to 15% by weight of the formula, preferably 8 to 10%) of expanded vermiculite in conjunction with the sodium alginate as dual disintegrants. Using moderate amounts of vermiculate along with sodium alginate as dual disintegrants also enables more convenient production of a harder, more compact tablet than if vermiculite were to be used as the sole disintegrant.

The rapid and high degree of swelling of the vermiculite particles when contacted by water appreciably increases the rate of water penetration into the interior of the tablet, thereby decreasing the time required to obtain complete disintegration of the tablet. Rapid disintegration is quite important, as the high porosity of many potting soils allows free water to exist on the soil surface for only very brief periods following irrigation, and free water must be present until complete disintegration is accomplished. Also, the high degree of swelling causes the tablet to essentially push itself apart, spreading the individual particles over a wider surface area of soil and thereby aiding appreciably in obtaining more complete dispersion of the plant food over the soil surface and down into the soil pore spaces. Extensive dispersion of the plant food over and into the soil is important and critical with this invention, as it allows greater and more intimate contact of the plant food with bacterial activity in the soil insuring sufficiently rapid rates of conversion of plant food to available forms; it insures more uniform distribution of solubilized plant nutrients throughout the entire root system, and it minimizes possible root injury and plant damage from a localized concentration of fertilizer salts in a given soil area.

For example, tablets with satisfactory physical characteristics (hardness and size) and excellent disintegration and dispersal rates may be produced as follows:

| Ingredient: | Percent by wt. |
|---|---|
| Urea-formaldehyde 38% N | 37.6 |
| Calcium phosphite, 45% $P_2O_5$ | 10.0 |
| Fritted potash, 28% $K_2O$ | 20.8 |
| Potassium sulfate | 6.7 |
| Ferrous ammonium sulfate | 3.7 |
| Gypsum (calcium sulfate) | 8.7 |
| Expanded vermiculite, #4 grade | 9.0 |
| Kelgin F. (Sodium alginate) | 1.5 |
| Talc | 2.0 |
| Total | 100.0 |

I claim:
1. A fertilizer tablet weighing at least one-half gram, for slowly feeding a plant over a period of several months, comprising:
   a tabletted intimate mixture of solid particles of the following ingredients:
   a fertilizer composition that is very slowly water soluble and is to a large extent capable of being broken down into water-soluble substances by the continued action of soil bacteria, said fertilizer composition constituting the major ingredient of said tablet,
   talc in the amout of about 2% to 10% by weight of the table as a tableting lubricant which does not interfere with water penetration and disintegration of the tablet, and
   a tablet disintegrant in the amount of between ½% and 5% by weight of the tablet, chosen from the class consisting of alginic acid and its water-soluble salts,
   whereby said tablet on contact with a sprinkling or irrigation of water disintegrates in a time of the order of one minute to render its major ingredient accessible to the actions of subsequent water and of soil bacteria.

2. The tablet of claim 1 including as a minor ingredient a water-soluble fertilizer composition which provides an initial boost to the plant, succeeded by the long-term feeding from the said major ingredient of the tablet.

3. The table of claim 1 having as an additional tablet disintegrant from 5% to 15% by weight of the tablet of expanded vermiculite.

4. A fertilizer tablet weighing at least one-half gram, for slowly feeding a plant over a period of several months, comprising:
   a tabletted intimate mixture of solid particles of the following ingredients:
   a mixture of urea-formaldehyde, calcium phosphate, and fritted potash as a fertilizer composition constituting the major ingredient of said tablet,
   talc in the amount of about 2% to 10% by weight of the tablet as a tableting lubricant which does not interfere with water penetration and disintegration of the tablet, and
   sodium alginate as a tablet disintegrant in the amount of between ½% and 5% by weight of the tablet,
   whereby said tablet on contact with a sprinkling or irrigation of water disintegrates in a time of the order of one minute to render its major ingredient accessible to the actions of subsequent water and of soil bacteria.

5. The tablet of claim 1 having as an additional tablet disintegrant from 5% to 15% by weight of the tablet of expanded vermiculite.

References Cited

UNITED STATES PATENTS

| 1,513,298 | 10/1924 | Turrentine | 260—209.6 X |
| 3,024,098 | 3/1962 | Austin et al. | 71—64 |
| 3,214,261 | 10/1965 | Galloway | 71—64 X |

OTHER REFERENCES

Perry, J. H., Ed, Chemical Engineers Handbook, Mc-Graw-Hill Book Co., N.Y. (1950) 3rd Ed,. p. 1189, Scientific Library TP 155 p4.

DONALL H. SYLVESTER, *Primary Examiner.*

R. BAJEFSKY, *Assistant Examiner.*

UNITED STATES PATENT OFFICE
CERTIFICATE OF CORRECTION

Patent No. 3,338,700                          August 29, 1967

Hollis M. Barron

It is hereby certified that error appears in the above numbered patent requiring correction and that the said Letters Patent should read as corrected below.

Column 1, line 16, for "discoverey" read -- discovery --; line 18, for "talic" read -- talc --; line 22, for "applicant" read -- application --; column 2, line 27, for "intgredients" read -- ingredients --; line 65, before "and" insert -- steady --; column 3, line 36, for "inccuded" read -- included --; line 42, after "plant" insert -- food --; line 53, for "wtih" read -- with --; line 68, for "provides" read -- provide --; column 4, lines 4 and 5, strike out "durtent"; column 5, line 49, for "has" read -- had --; column 9, line 21, for "opogan" read -- opogon --; column 12, lines 13 and 31, for "table", each occurrence, read -- tablet --.

Signed and sealed this 8th day of October 1968.

(SEAL)
Attest:

EDWARD M. FLETCHER, JR.                      EDWARD J. BRENNER
Attesting Officer                              Commissioner of Patents